(12) United States Patent
Herring et al.

(10) Patent No.: US 10,776,844 B2
(45) Date of Patent: Sep. 15, 2020

(54) METHOD, COMPUTER PROGRAM PRODUCT, AND SYSTEM FOR PROVIDING A SENSOR-BASED ENVIRONMENT

(71) Applicant: Toshiba Global Commerce Solutions Holdings Corporation, Tokyo (JP)

(72) Inventors: Dean Frederick Herring, Youngsville, NC (US); Brad Matthew Johnson, Raleigh, NC (US); Adrian Xavier Rodriguez, Durham, NC (US); Jeffrey John Smith, Raleigh, NC (US); Kathleen Wahrer, Castro Valley, CA (US)

(73) Assignee: Toshiba Global Commerce Solutions, Tokyo (JP)

(*) Notice: Subject to any disclaimer, the term of this patent is extended or adjusted under 35 U.S.C. 154(b) by 291 days.

(21) Appl. No.: 14/675,025

(22) Filed: Mar. 31, 2015

(65) Prior Publication Data
US 2016/0110799 A1 Apr. 21, 2016

Related U.S. Application Data

(60) Provisional application No. 62/064,323, filed on Oct. 15, 2014.

(51) Int. Cl.
*G06Q 30/00* (2012.01)
*G06Q 30/06* (2012.01)
(Continued)

(52) U.S. Cl.
CPC ......... *G06Q 30/0623* (2013.01); *G01B 11/00* (2013.01); *G01G 19/4144* (2013.01);
(Continued)

(58) Field of Classification Search
CPC . G06Q 30/0235; G06Q 10/06; G06Q 30/0201
(Continued)

(56) References Cited

U.S. PATENT DOCUMENTS 4,964,053 A * 10/1990 Humble .................. A47F 9/048
186/61
5,235,509 A * 8/1993 Mueller ............... G06Q 10/087
345/173
(Continued)

OTHER PUBLICATIONS

Caterinicchia, D. (Aug. 3, 2007). Kiosks help customers help themselves. Oakland Tribune Retrieved from https://search.proquest.com/docview/352224145?accountid=14753 (Year: 2007).*
(Continued)

*Primary Examiner* — Brittney N Miller
*Assistant Examiner* — Arielle E Weiner
(74) *Attorney, Agent, or Firm* — Patterson + Sheridan, LLP

(57) ABSTRACT

Method, computer program product, and system to provide assistance to at least a first person during a transaction within an environment having a plurality of items. The method includes identifying the first person within the environment, and analyzing acquired image information to determine at least one item interaction of the transaction and thereby associate the identified first person with the transaction. The method further includes determining whether the first person is associated with a personal profile that includes information related to the environment, the information including at least one of personal preferences and personal historical data reflecting one or more previous transactions of the first person. When the first person is determined to be associated with a personal profile, the method further includes determining, based on the information in the personal profile, an amount of assistance to provide to the first person during the transaction.

20 Claims, 8 Drawing Sheets

(51) Int. Cl.

| | |
|---|---|
| G07G 1/00 | (2006.01) |
| G06Q 20/20 | (2012.01) |
| G06Q 10/08 | (2012.01) |
| G06T 7/66 | (2017.01) |
| G01B 11/00 | (2006.01) |
| G01G 19/414 | (2006.01) |
| G01S 19/13 | (2010.01) |
| G06F 1/16 | (2006.01) |
| G06F 3/01 | (2006.01) |
| G06K 9/00 | (2006.01) |
| G06K 9/20 | (2006.01) |
| G06K 9/46 | (2006.01) |
| G06K 9/62 | (2006.01) |
| G06Q 20/18 | (2012.01) |
| G06Q 30/02 | (2012.01) |
| G06T 11/60 | (2006.01) |
| H04N 5/225 | (2006.01) |
| H04N 5/232 | (2006.01) |
| H04N 7/18 | (2006.01) |
| G06Q 20/32 | (2012.01) |
| G06K 9/78 | (2006.01) |
| G01G 19/40 | (2006.01) |
| G01B 11/02 | (2006.01) |

(52) U.S. Cl.
CPC .............. *G01S 19/13* (2013.01); *G06F 1/163* (2013.01); *G06F 3/012* (2013.01); *G06F 3/013* (2013.01); *G06K 9/00221* (2013.01); *G06K 9/00255* (2013.01); *G06K 9/00288* (2013.01); *G06K 9/00362* (2013.01); *G06K 9/00536* (2013.01); *G06K 9/00577* (2013.01); *G06K 9/00624* (2013.01); *G06K 9/209* (2013.01); *G06K 9/46* (2013.01); *G06K 9/6201* (2013.01); *G06K 9/6267* (2013.01); *G06K 9/78* (2013.01); *G06Q 10/087* (2013.01); *G06Q 20/18* (2013.01); *G06Q 20/204* (2013.01); *G06Q 20/208* (2013.01); *G06Q 20/209* (2013.01); *G06Q 20/322* (2013.01); *G06Q 30/016* (2013.01); *G06Q 30/0224* (2013.01); *G06Q 30/0235* (2013.01); *G06Q 30/0251* (2013.01); *G06Q 30/0269* (2013.01); *G06Q 30/0609* (2013.01); *G06Q 30/0629* (2013.01); *G06Q 30/0631* (2013.01); *G06Q 30/0633* (2013.01); *G06Q 30/0635* (2013.01); *G06Q 30/0639* (2013.01); *G06T 7/66* (2017.01); *G06T 11/60* (2013.01); *G07G 1/0045* (2013.01); *G07G 1/0054* (2013.01); *G07G 1/0063* (2013.01); *G07G 1/0072* (2013.01); *H04N 5/225* (2013.01); *H04N 5/232* (2013.01); *H04N 7/181* (2013.01); *G01B 11/02* (2013.01); *G01G 19/40* (2013.01); *G06K 2009/00328* (2013.01); *G06K 2209/17* (2013.01); *G06T 2207/30232* (2013.01)

(58) Field of Classification Search
USPC ......... 705/2, 7.29; 340/572.1; 706/26.1–27.2
See application file for complete search history.

(56) References Cited

U.S. PATENT DOCUMENTS

| | | | |
|---|---|---|---|
| 6,367,694 | B1 | 4/2002 | Roslak |
| 8,639,543 | B2 * | 1/2014 | Boss ..................... G06Q 10/06 340/572.1 |
| 2002/0016740 | A1 * | 2/2002 | Ogasawara ........... G06Q 30/02 705/26.1 |
| 2002/0079367 | A1 * | 6/2002 | Montani ................ A47F 9/047 235/383 |
| 2003/0217892 | A1 * | 11/2003 | Persky ................ G07G 1/0054 186/68 |
| 2008/0228549 | A1 * | 9/2008 | Harrison ............... G06Q 10/06 705/7.14 |
| 2011/0060641 | A1 | 3/2011 | Grossman et al. |
| 2011/0112890 | A1 * | 5/2011 | Chu ................... G06Q 30/0204 705/7.33 |
| 2011/0191117 | A1 * | 8/2011 | Hashim-Waris ........................... G06Q 30/0235 705/2 |
| 2011/0295704 | A1 | 12/2011 | Edwards |
| 2012/0320199 | A1 * | 12/2012 | Kundu .................. G06O 30/06 348/143 |
| 2013/0232037 | A1 | 9/2013 | Edwards et al. |
| 2013/0254044 | A1 | 9/2013 | Catoe |
| 2013/0256395 | A1 | 10/2013 | Barkan et al. |
| 2014/0052554 | A1 * | 2/2014 | Abraham ................ G07G 1/14 705/21 |
| 2014/0081738 | A1 | 3/2014 | Abraham |
| 2014/0214484 | A1 * | 7/2014 | Hirakawa .......... G06Q 30/0201 705/7.29 |
| 2015/0012396 | A1 | 1/2015 | Puerini et al. |
| 2015/0019391 | A1 | 1/2015 | Kumar et al. |
| 2015/0039388 | A1 * | 2/2015 | Rajaraman ......... G06Q 30/0613 705/7.29 |

OTHER PUBLICATIONS

McMillin et al.: "Context-Aware Grocery Self-Checkout", http://kevin.mcmill.in/does/self-checkouts.pdf, Dec. 31, 2011.

Toshiba Self Checkout System 6—Designed with the Shopper in Mind, http://public.dhe.ibm.com/common/ssi/ecm/en/rtd12536usen/RTD12536USEN.PDF, Dec. 31, 2012.

Wincor-Nixdorf: Self-Checkout More Service for Your Customers, http://www.wincor-nixdorf.com/internet/cae/servlet/contentblob/717668/publicationFile/77576/Brochure-download.pdfm, Dec. 31, 2012.

Is Giant Eagle's Forced Self-Checkout CRM Tactic Smart?, http://www.fierceretail.com/story/is-giant-eagles-forced-self-checkout-crm-tactic-smart, Dec. 31, 2013.

A Guide from SelfServiceWorld.com: Self-Checkout, SelfServiceWorld.com, http://www.utopiatechnologygroup.com/wp-content/uploads/2013/09/gselfcheck.pdf, Dec. 31, 2012.

Huettinger et al.: "Unmanned Bonds: The Impact of Self-Sutomated Service on Consumer Loyalty", Inzinerine Ekonomika-Engineering Economics, 2011, 22(2), pp. 203-2013.

Self-checkout Solutions for Kiosks, Grocery and Supermaket: "Self-Checkout: Bringing Self Service to the Mainstream", http://www.cryptera.com/industry-solutions/retail, Jul. 30, 2014.

* cited by examiner

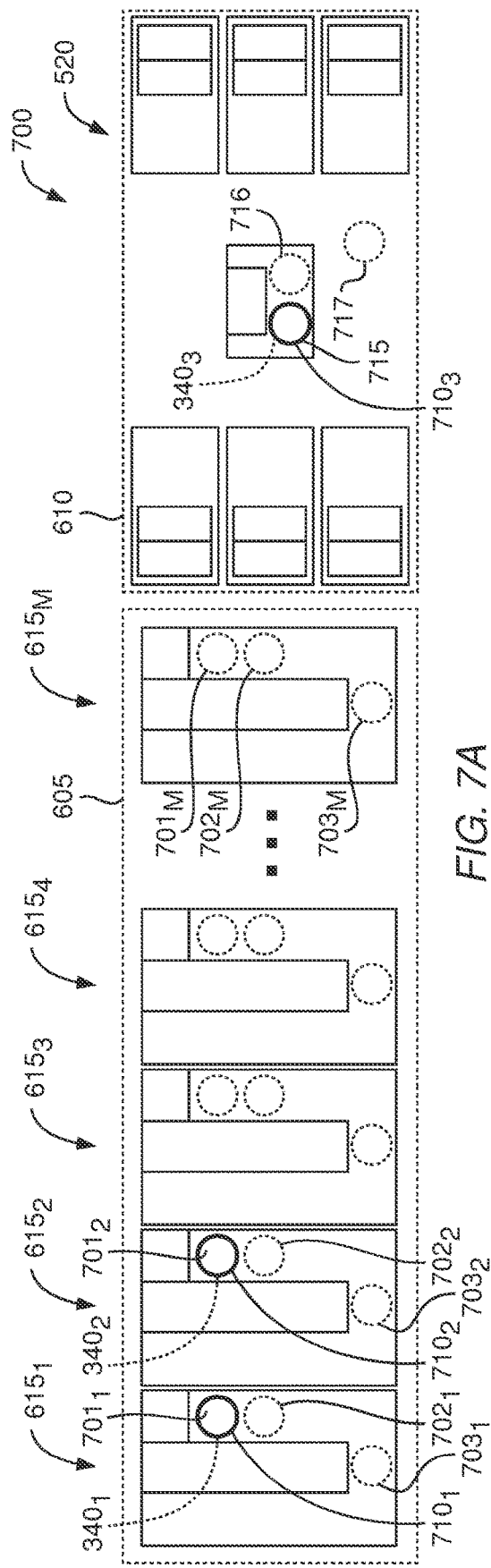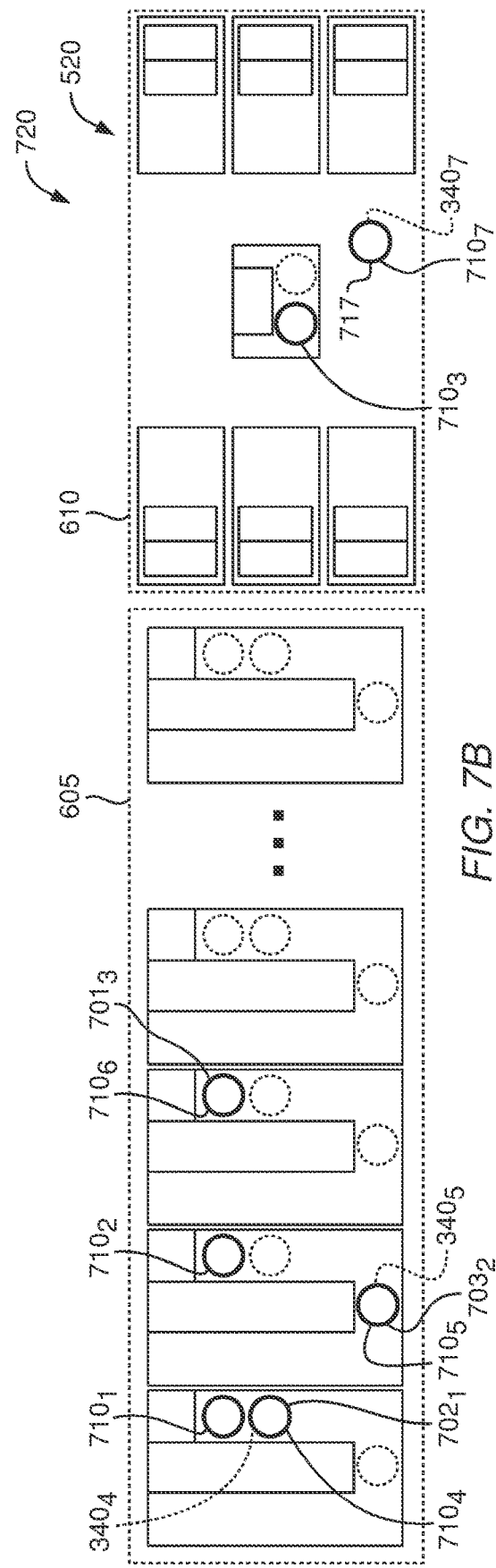
FIG. 7A
FIG. 7B

METHOD, COMPUTER PROGRAM PRODUCT, AND SYSTEM FOR PROVIDING A SENSOR-BASED ENVIRONMENT

CROSS-REFERENCE TO RELATED APPLICATIONS

This application claims benefit of U.S. provisional patent application Ser. No. 62/064,323, filed Oct. 15, 2014, entitled "Integrated Shopping Environment," which is herein incorporated by reference.

BACKGROUND

The present disclosure relates to a sensor-based environment, and more specifically, to providing an adaptive personalized experience within such an environment by providing assistance to a person during a transaction based on personal profile information associated with the person.

BRIEF DESCRIPTION OF THE SEVERAL VIEWS OF THE DRAWINGS

FIGS. 7A and 7B illustrate exemplary assignment distributions of employees within a checkout area of an environment, according to one embodiment.

Figure 1:
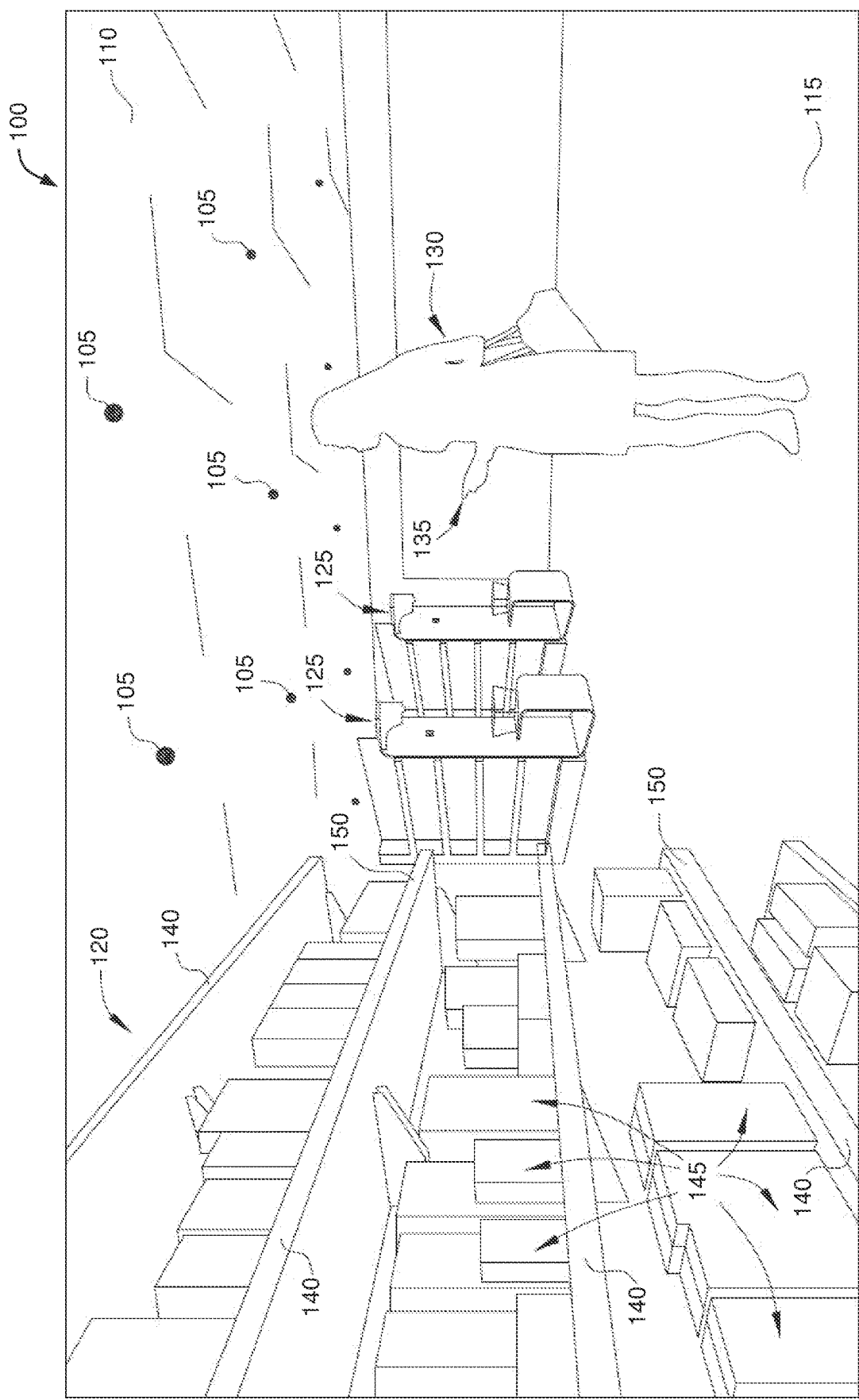
FIG. 1 illustrates an exemplary environment including a plurality of items, according to one embodiment.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Aspects of the current disclosure relate to an integrated environment capable of providing a personalized, automated, and adaptive experience for a person within the environment. A number of different sensor devices may be employed within the environment, and networked with various computing devices such as point-of-sale (POS) terminals, digital signage, servers, and mobile or handheld computing devices to provide a seamless integration of mobile technologies and e-commerce into traditional experiences.

Using a system having one or more visual sensors within the environment, a retailer or other provider may compile and process environmental data regarding a person's transaction in the environment by identifying interactions of the person with one or more items in the environment. Identification of the items may be based on an analysis of static imagery, such as an image of the person's shopping receptacle at a particular time. The interactions may include any suitable actions of the person, such as handling the item, placing the item in a shopping receptacle, walking away from the item's original location with the item, etc. The identification of items and interactions may occur at the point of selection of the items, such as shelving units that display the items, or at other designated areas within the environment. In some cases, the system may use the identified items to determine a level of difficulty of the transaction, which may be based on one or more predetermined classes of items that are deemed to be difficult and/or difficulty scores for the items. The system may further assess the proficiency of the employees assigned to different areas of the environment, as well as the proficiency of the person to determine whether the transaction can be completed according to one or more transaction goals, e.g., with few errors, with few assistance calls by the person, within a particular amount of time, and so forth. Based on the determination, the system may determine whether to provide assistance to the person during the transaction, which can include determining an updated distribution of personnel assignments (such as by reassigning an employee already assigned within a particular area, by assigning additional employees to the area, etc.). Although several examples are directed to assisting the person during a checkout transaction, it is contemplated that similar assistance may be provided to the person at any stage during a transaction, such as while the person views, handles, and/or selects items from shelving units, while the person orders items at a counter, and so forth.

By adaptively determining an amount of assistance to provide to a person during a transaction in the environment, a retailer may streamline operations within areas of the environment to support greater customer throughput, as well as provide an improved experience for the customers. The retailer may also compile valuable data on employee performance, identifying strengths and deficiencies to support employee training and development programs. While generally discussed within the context of a shopping environment, such as a retail store or other commercial environment, it is contemplated that the techniques disclosed herein may be applied to other environments (some non-limiting examples include libraries, museums, classrooms, hospitals, etc.) to provide a comparable experience for persons having transactions therein.

FIG. 1 illustrates an exemplary environment including a plurality of items, according to one embodiment. The environment 100 includes a plurality of sensor modules 105 disposed in the ceiling 110 of the environment. The sensor modules 105 may each include one or more types of sensors, such as video sensors (e.g., cameras), audio sensors (e.g., microphones), and so forth. Sensor modules 105 may also include actuating devices for providing a desired position and/or orientation of the included sensor(s). Generally, the sensor modules or individual sensors may be disposed at any suitable location within the environment 100. Some non-limiting examples of alternative locations include below, within, or above a floor 115 of the environment, within other structural components of the environment 100 such as a shelving unit 120 or walls, and so forth. In some embodiments, sensors may be disposed on, within, or near item display areas such as the shelving unit 120. The sensors may be oriented toward expected locations of personal interactions with items in order to acquire better data about the person's interactions, such as determining the person's field of view relative to certain items, updating a virtual cart or transaction record for the person's transaction in the environment, and so forth.

Environment 100 also includes a number of computer-based terminals (or kiosks) 125. Generally, terminals 125 may be configured for performing customer checkout and/or other functions, such as providing information to a customer or employee. Each terminal 125 may each include a discrete computing device or portions of a computing system, and may include various I/O devices, such as visual displays, audio speakers, cameras, microphones, etc. for interacting with various persons such as customers and/or employees. In some embodiments, a person 130 in the environment may have a mobile computing device, such as a smartphone 135, that communicatively couples with the terminal 125 for completing a checkout transaction. For example, the person's smartphone 135 may include payment information, identification information, etc. that facilitate completion of the checkout transaction. In one embodiment, the mobile computing device may execute a store application that connects with the computing system of the environment (e.g., to store servers or other computing devices through the Internet). In one embodiment, the mobile computing device may be directly connected with kiosk 125 through wireless networks established within the environment (e.g., over Wi-Fi or Bluetooth). In one embodiment, the mobile computing device may couple with the kiosk 125 when brought within range, e.g., using Bluetooth or near-field communication (NFC).

Environment 100 also includes one or more shelving units 120 having shelves 140 that support various store items 145. Though not shown, multiple shelving units 120 may be disposed in a particular arrangement in the environment 100, with the space between adjacent shelving units forming aisles through which customers and employees may travel. For example, customers may navigate the aisles and/or approach the shelving units 120 to view items 145 included therein, to handle the items, to select the items, etc. In another example, employees may navigate the aisles and/or approach the shelving units 120 to view stock levels of the items 145, to determine out-of-place items, etc. In some embodiments, shelving units 120 may include visual sensors or other sensor devices or I/O devices. The sensors or devices may couple with the person's smartphone 135 and/or other networked computing devices (including terminals 125 and/or servers) that are associated with the environment 100. For example, the front portions 150 of shelves 140 may include video sensors oriented outward from the shelving unit 120 (i.e., toward the aisle) to acquire image information for a person's interactions with items 145 on the shelving unit 120, with the image information provided to back-end servers for storage and/or analysis. In some cases, some or all of the image information may also be accessible by a person's mobile computing device. In some embodiments, portions of the shelving unit 120 (such as the front portions 150 of shelves 140) may include indicator lights or other visual display devices or audio output devices that are able to communicate with a person.

During an exemplary transaction in the environment, the person 130 may have a shopping receptacle in which the person places items after they are selected for purchase. Examples of shopping receptacles include shopping carts, baskets, or other containers that may be carried or otherwise transported by the person during the transaction. Upon completion of the transaction—for example, the person has acquired all of the desired items—the person may approach one of the terminals 125 or a designated checkout area to perform a checkout portion of a transaction (also referred to as a "checkout transaction").

In some cases, the checkout transaction may have "touchless" aspects or may be entirely touchless. For example, visual sensors included in the environment and/or within the approached terminal 125 may acquire image information that is usable to identify the person, items within the shopping receptacle, etc. and that streamlines or otherwise facilitates the checkout transaction. In some cases, a person may be able to complete a checkout transaction simply as part of departing the environment, without requiring the person to stop at a checkout terminal or in the checkout area. In some cases, the person's time in the checkout area may be significantly reduced, such as only a momentary pause at a checkout terminal.

As will be discussed further herein, logic may be applied to the acquired image information to determine what assistance will be provided to a person during a transaction in the environment. The logic may use information included in a personal profile associated with the person to provide assistance that is adapted to the person, which may result in more helpful assistance while not seeming unduly intrusive to the person. The personal profile generally may include one or more personal preferences and/or historical data reflecting previous transactions of the person. In some embodiments, the determined type and/or amount of assistance may be based on determined proficiency information for the person and/or employees in the environment. For example, the assistance may be determined based on the employees currently assigned to the checkout area.

It may be important to determine a personalized type and amount of assistance to provide to a person during a transaction. For some individuals, providing additional assistance may help to streamline aspects of the transaction, while other individuals in similar circumstances might be slowed by the same assistance. Overall, providing the right amount and type of assistance may result in the person spending a shorter time completing their transaction and can improve their overall transaction experience. Reducing time for transactions also increases the collective throughput at various areas of the environment.

Figure 2:
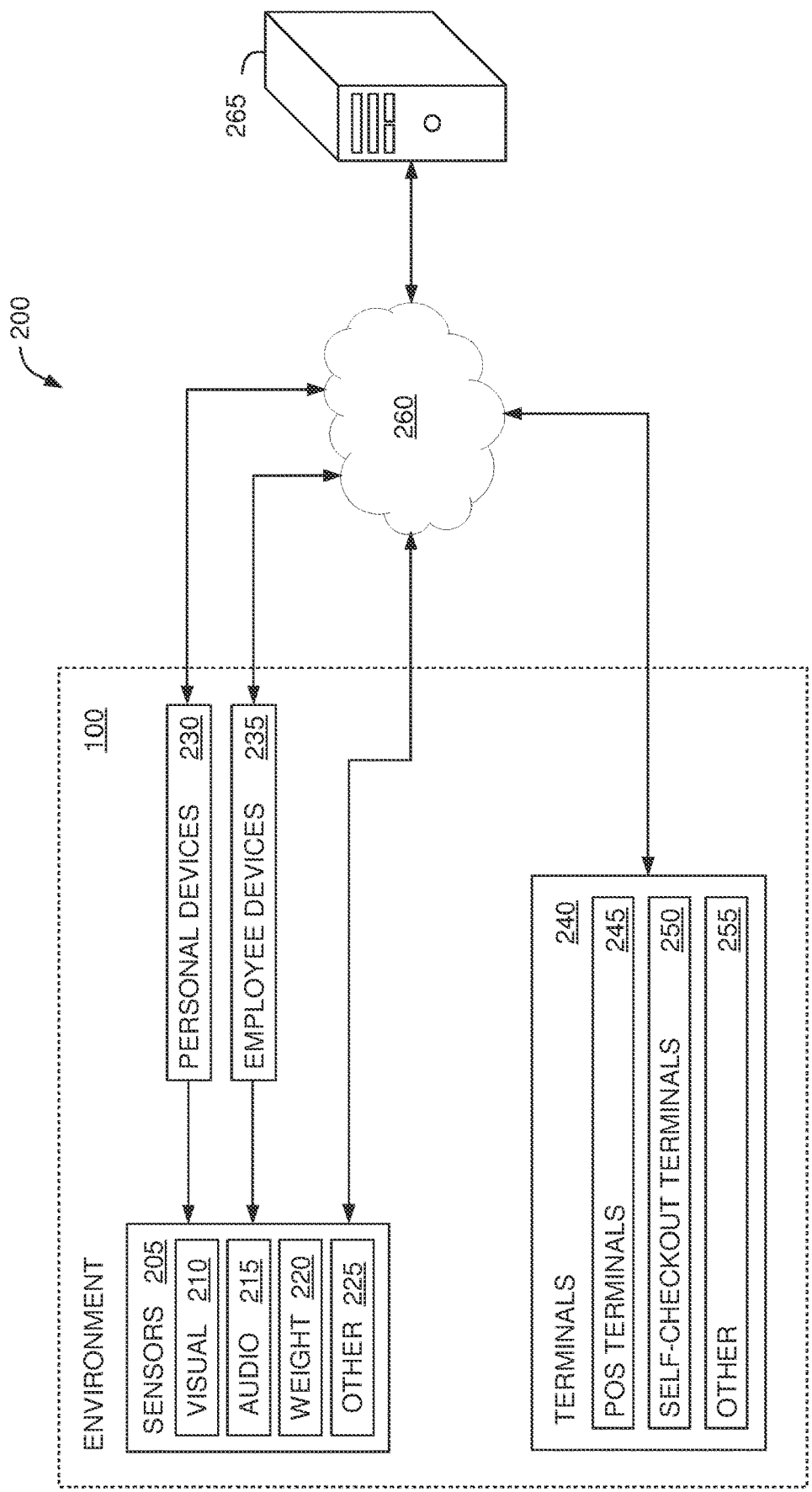
FIG. 2 illustrates an exemplary system to provide assistance to a person during a transaction within an environment having a plurality of items, according to one embodiment.

FIG. 2 illustrates an exemplary system to provide assistance to a person during a transaction within an environment having a plurality of items. The system 200 includes a number of components that are disposed within the environment 100. The system may also include components that are outside the environment—for example, a server 265 may be located remotely or proximately disposed to the environment (such as within a back room in the same building that is not accessible by customers).

Components within the environment include one or more sensors 205 of various types, such as visual sensors 210, audio sensors 215, and weight sensors 220. The sensors 205 may also include other sensors 225 capable of providing meaningful information about personal interactions within the environment, e.g., location sensors. The sensors 205 may be discrete sensor devices deployed throughout the environment 100 in fixed and/or movable locations. Sensors 205 may be statically included in walls, floors, ceilings, displays, or other non-sensor devices, or may be included in shopping receptacles capable of being transported through the environment. For example, weight sensors 220 may be disposed in fixed locations within the environment, such as within the floor or within a surface of a checkout terminal, and may also include load cells or other sensors disposed in a basket portion of a shopping receptacle. In one embodiment, sensors 205 may include adjustable-position sensor devices, such as motorized cameras (i.e., an example of visual sensors 210) attached to a rail, wire, or frame. In one embodiment, sensors 205 may be included on one or more unmanned vehicles configured to travel through some or all of the environment 100, such as unmanned ground vehicles (UGVs) or unmanned aerial vehicles (UAVs or "drones"). Sensors 205 may also include sensor devices that are included in computing devices associated with the environment 100, such as personal devices 230, employee devices 235, and terminals 240. In some cases, the computing devices (or the component sensor devices) may be implemented as body-worn or carried devices.

Personal devices 230 and employee devices 235 may each include passive or actively-powered devices capable of communicating with at least one of the networked devices of system 200. One example of a passive device (which may be worn or carried) is a NFC tag. Active devices may include mobile computing devices, such as smartphones or tablets, or wearable devices such as a Google Glass™ interactive eyepiece (Glass is a trademark of Google Inc.). The personal devices 230 generally denotes ownership or possession of the devices by customers within the environment 100, while the employee devices 235 denotes ownership or possession by the retailer or other administrator of the environment 100. In some cases, employee devices 235 may be carried by employees and used in the course of their employment. Personal devices 230 and employee devices 235 may execute applications or other program code that generally enables various functions and features accessible using server 265 and/or other networked computing devices. In some embodiments, sensor devices that are included with the personal devices 230 or employee devices 235 may be included in the sensors 205.

System 200 includes a plurality of terminals 240 within the environment 100. Terminals 240 generally include any structure that is capable of receiving input from and/or producing output to people (e.g., customers, employees) within the environment 100. The terminals 240 may include computing systems, portions of computing systems, or devices controllable by computing systems. In one example, a terminal 240 may include a computing device that is communicatively coupled with a visual display and audio speaker(s), as well as being communicatively coupled with one or more input devices. In another example, a terminal 240 may include a visual display and associated driver hardware, but a computing device coupled to the terminal and providing data for display is disposed separately from the terminal. In some embodiments, terminals 240 may be implemented as standalone devices, such as a kiosk disposed on the store floor or monolithic device disposed on a shelf or platform. In some embodiments, terminals 240 may be integrated partially or wholly with other components of the environment 100, such as input or output devices included with shelving or other structural components in the environment (e.g., components used for product display or storage). In some embodiments, terminals 240 may be modular and may be easily attachable and detachable to elements of the environment 100, such as the structural components.

Generally, terminals 240 may be distributed throughout the environment 100 and may enhance various phases of the person's transactions within the environment. For example, terminals 240 may include digital signage (i.e., included as an example of other terminals 255) disposed throughout the environment, such as included in or near aisles, endcaps, displays, and/or shelving in the environment. A person during a transaction may view and/or interact with the digital signage as he or she moves throughout the environment. The digital signage may be included in a static display or may be movable, such as including digital signage within a shopping receptacle. Terminals 240 may also include one or more types of terminals usable for completing checkout transactions, such as employee-manned POS terminals 245 and self-checkout terminals 250. In some cases, the terminals 240 that provide checkout functionality may be disposed within a designated checkout area within the environment 100.

In some embodiments, terminals 240 may provide an integrated functionality. For example, terminals 240 may function in a first mode as digital signage, and when engaged by a person (i.e., receiving input from the person), the terminals function in a second mode as a self-checkout terminal or other type of terminal.

Server 265 generally includes processor(s), memory, and communications capabilities and may perform various computing tasks to support the operation of the environment 100. Server 265 may communicate using various wired and/or wireless communications methods with terminals 240, sensors 205, and with other networked devices such as personal devices 230 and employee devices 235. Server 265 generally executes computer program code in which input data is received from networked devices, the input data is processed and/or stored by the servers, and output data is provided to networked devices for operation of the environment 100.

Network 260 may include one or more networks of various types, including a local area or local access network (LAN), a general wide area network (WAN), and/or a public network (e.g., the Internet). In one embodiment, various networked computing devices of the system 200 are interconnected using a LAN, and one or more computing devices (e.g., server 265, personal devices 230) include connections to the Internet.

Figure 3:
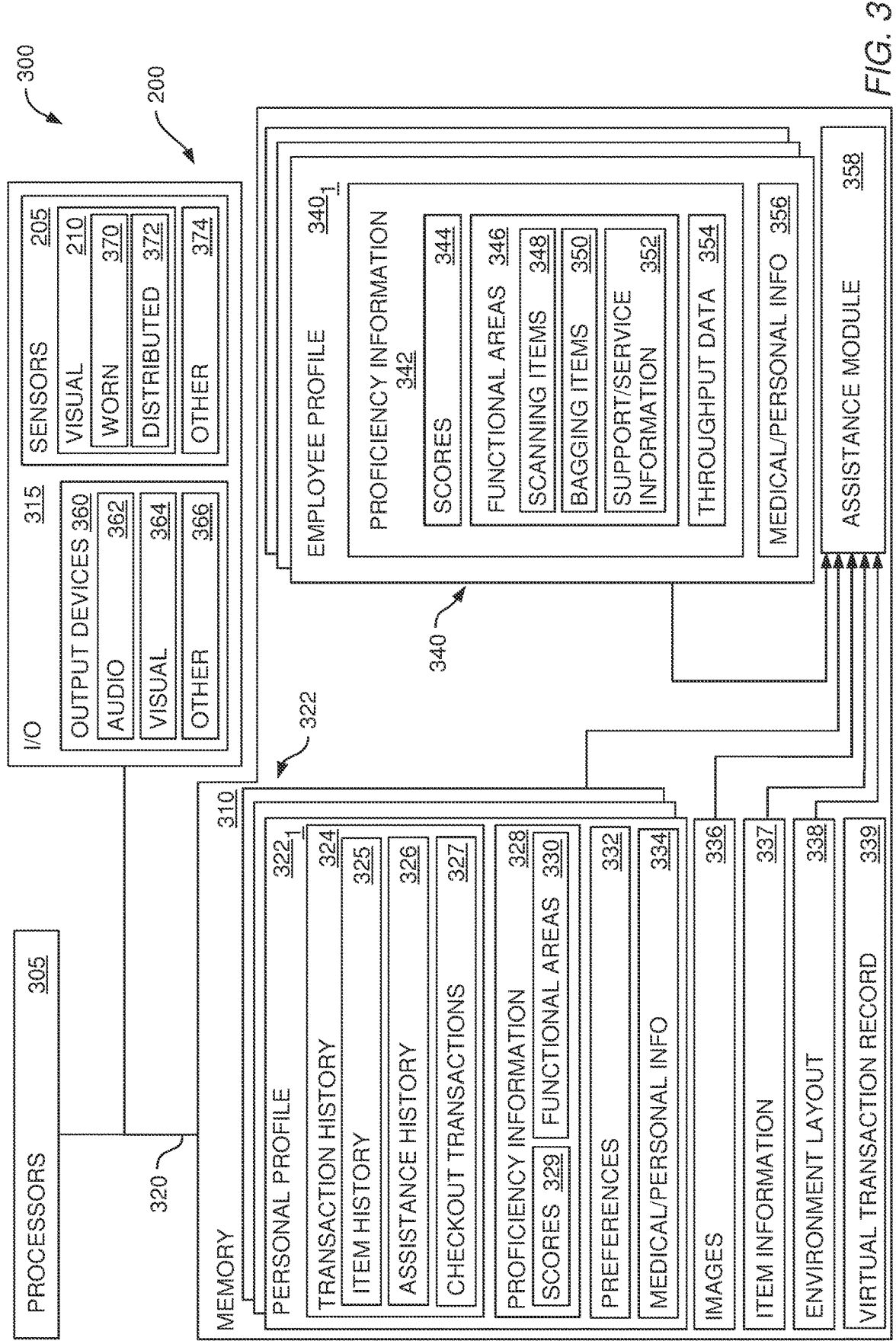
FIG. 3 is a block diagram illustrating operation of a system to provide assistance to a person during a transaction within an environment having a plurality of items, according to one embodiment.

FIG. 3 is a block diagram illustrating operation of a system to provide assistance to a person during a transaction within an environment having a plurality of items, according to one embodiment. Specifically, the arrangement 300 illustrates operation of the system 200. Arrangement 300 includes a number of processors 305, memory 310, and input/output 315, which are interconnected using one or more connections 320. In one embodiment, the arrangement 300 may be implemented as a singular computing device and connection 320 may represent a common bus. In other embodiments, arrangement 300 is distributed and includes a plurality of discrete computing devices that are connected through wired or wireless networking. The processors 305 may include any processing element suitable for performing functions described herein, and may include single or multiple core processors, as well as combinations thereof. Processors 305 may be included in a single computing device, or may represent an aggregation of processing elements included across a number of networked devices such as personal devices 230, terminals 240, etc.

Input/output (I/O) 315 includes one or more output devices 360 and one or more sensors 205. Output devices 360 include one or more devices for presenting information to customers and generally include audio output devices 362 and/or visual output devices 364. The audio output devices 362 may include conventional audio speakers having any suitable form factor (e.g., standalone, integrated in a stereo, headphones, etc.), as well as devices using alternative methods of producing sound perceptible by a person such as a customer or employee, such as bone conduction transducers in a worn device. Visual output devices 364 may include visual displays and various visual indicators such as light emitting diodes (LEDs). In some embodiments, the terminals 240, personal devices 230, and employee devices 235 of FIG. 2 may include output devices 360, such as visual devices 364 (e.g., visual displays, indicators) and/or audio devices 362 (e.g., speakers) for communicating with persons during their transactions. Other output devices 366 may provide information to customers through tactile feedback (e.g., haptic devices) or using other sensory stimuli. Sensors 205 may include visual sensors 210 which may be carried or worn sensors 370, and distributed sensors 372 that are disposed throughout the environment. In one embodiment, the distributed sensors 372 are disposed in a static arrangement in the environment. In one embodiment, at least some of the distributed sensors 372 are movable. For example, the distributed sensors 372 may be included on movable product displays or structures, and/or unmanned vehicles (e.g., aerial or ground-based vehicles). Other sensors 374 may also be included that are suitable for collecting information about a person and his/her interactions within the environment. Examples of other sensors 374 include without limitation infrared (IR) sensors, thermal sensors, weight sensors, capacitive sensors, magnetic sensors, sonar sensors, radar sensors, lidar sensors, and so forth.

I/O 315 may also include input devices (not shown) suitable for receiving input from persons, such as cameras, keyboards or keypads, touchscreens, buttons, inertial sensors, etc. I/O 315 may further include wired or wireless connections to an external network (e.g., network 260) using I/O adapter circuitry.

The visual sensors 210 may be used to capture one or more images 336 (also referred to as "image information") of the person and/or the environment, which may include views from various perspectives (e.g., a customer-worn visual sensor, static or movable visual sensors at various locations in the environment). The images 336 may be stored in memory 310, and may be individually or collectively processed by processors 305 to determine information about persons within the environment and their respective interactions with items in the environment.

Memory 310 may include a variety of computer-readable media selected for their size, relative performance, or other capabilities: volatile and/or non-volatile media, removable and/or non-removable media, etc. Memory 310 may include cache, random access memory (RAM), storage, etc. Storage included as part of memory 310 may typically provide a non-volatile memory for the networked computing devices (e.g., server 265), and may include one or more different storage elements such as Flash memory, a hard disk drive, a solid state drive, an optical storage device, and/or a magnetic storage device. Memory 310 may be included in a single computing device or may represent an aggregation of memory included in networked devices. Memory 310 may include a plurality of modules for performing various functions described herein. The modules generally include program code that is executable by one or more of the processors 305. As shown, modules include an assistance module 358 and may also include item and/or person identification modules (not shown) configured to analyze the images 336 and/or item information 337. The modules may also interact to perform certain functions. For example, assistance module 358 makes calls to an item identification module and/or person identification module to determine item difficulty scores and/or personal proficiencies for a checkout transaction. The person of ordinary skill will recognize that the modules provided here are merely non-exclusive examples; different functions and/or groupings of functions may be included as desired to suitably operate the environment.

Memory 310 includes a plurality of personal profiles 322 corresponding to the different persons. The personal profiles 322 may be associated with a loyalty program administered in the environment, which generally provides rewards or other incentives based on compiled transaction data for a person (or for a group of people). During operation of the system 200, the personal profiles 322 may be associated with a current transaction for a person after identifying the person using the person's portable computing device (e.g., a login using a phone app), a visual scan of the person's loyalty card or the person's face or other identifying features, etc. In one embodiment, the personal profiles 322 and image information 336 may be stored on the server 265 or on a separate database.

Personal profiles 322 include a transaction history 324 that includes information associated with the person's previous and/or current transactions within the environment. The transaction history 324 may also reflect the person's previous transactions within other environments—for example, the person may have completed transactions at several different store locations. The transaction history 324 includes an item history 325 reflecting previous item interactions for the person, which may have occurred earlier in time during the current transaction and/or during previous transactions. The item history 325 may include an item purchase history, item viewing history, item handling history and associated behaviors, determined interest levels for items, etc. Transaction history 324 includes an assistance history 326 reflecting previous help interactions for the person, which may have occurred earlier in time during the current transaction and/or during previous transactions. Assistance history 326 may include information about the person's interactions with employees and corresponding to location data within the environment, such as on the store floor, at checkout, etc. Assistance history 326 may include information about the person's interactions with computer-based assistance, such as might be interactively provided through a self-checkout terminal or using computing devices (e.g., a kiosk or mobile computing device) during the transactions. Transaction history 324 may also include information categorized by different stages of the transaction and/or areas of the environment. In one example, transaction history 324 may include information compiled from one or more checkout transactions 327 previously completed by the person. In another example, transaction history 324 may include information compiled from particular departments or near terminals within the environment.

Personal profiles 322 include proficiency information 328 for the person. To provide an accurate assessment of how much assistance the person requires for a given transaction, such as during a checkout transaction, the person may be rated using one or more scores 329 which may correspond to one or more functional areas 330. The scores 329 may represent numerical values, tiers, etc. and are generally based on the person's item history 325 and/or assistance history 326. The scores may be independent assessment values or may reflect compiled statistics for the person, e.g., average time required to complete a checkout transaction, average number of mistakes, etc. The functional areas 330 generally relate to various functions that may be typically performed in the environment, such as locating items, handling items, scanning items at a self-checkout terminal, bagging items, presenting payment, proficiency with the user interface of the self-checkout terminal, etc. In one embodiment, each of the scores corresponds with one of the functional areas. In one embodiment, the scores correspond to various predetermined classes of "difficult" items. Generally, certain items within the environment may be designated or classified as difficult due to a difficulty in handling and/or processing during a transaction. Classes of difficult items are discussed below with respect to FIG. 4, but some examples include large or bulky items, loose items such as produce that is weighed or requires entry of a product code, items that require additional interactions with the person, such as a verification of the person's age or offering a warranty/service plan for the items, etc.

Personal profiles 322 also include personal preferences 332 reflecting preferences that are explicitly specified by the person, or that may be deduced by the system based on the person's item history 325, assistance history 326, etc. The person may specify preferences using a personal computing device (e.g., through a mobile computing app associated with the environment) or through terminals or other computing devices accessible in the environment. In one example, a person may prefer to speak with a store associate instead of navigating through an interactive help menu on a self-checkout terminal. Thus, when determining an amount of assistance to provide to the person, the system 200 may assign additional personnel to the area so that adequate human assistance is accessible for the person during a checkout transaction. In another example, a person prefers to not handle large or bulky items, which could be deduced based on the person's historical help requests for large items included in assistance history 326.

Personal profiles 322 may also include medical or personal information 334. For example, a person could specify that they have certain physical disabilities or limitations, such as requiring a cane to walk, having a bad back, etc. that may affect their ability to perform certain item interactions within the environment. In some embodiments, physical conditions may be correlated with certain classes of difficult items to determine an appropriate type and/or amount of assistance for the person. For example, a bad back may be linked to bulky items, so that the system may prospectively assign an employee who is able to lift a bulky item for the person during a particular transaction. For example, the prospective assignment may be performed based on acquired image or location information for the person, such as the person viewing the bulky item or the person approaching an area including the bulky item. The prospective assignment may also be based on information suggesting that the person will interact with the item in a certain way—for example, the person may include the bulky item in a shopping list on a mobile device app (suggesting a handling of the item) or may have previously purchased the item (suggesting another purchase). In another example, the medical or personal information 334 may reflect demographic information for the person through self-identification or deduced from other (images 336 and/or item history 325) information. For example, the person may self-identify as a mother having a number of young children in the household, one or more children may be included with the person in images 336 from previous transactions, or the person may have an item history 325 indicating purchased items that tend to suggest children (e.g., baby food, toys, diapers). Accordingly, the system may determine that the person may require relatively more assistance during a transaction, e.g., by presuming the person would bring the children along.

Memory 310 may also include other information related to the environment, such as item information 337 (e.g., size, weight, shape, and other properties of the items) and the environment layout 338 (e.g., a planogram) which may be used for associating the items with the amount of assistance to provide to a person during the transaction.

Memory 310 also includes a plurality of employee profiles 340 corresponding to the different employees within the environment. Similar to the structure of personal profiles 322, employee profiles 340 may include various elements of proficiency information 342 for the employee. The proficiency information 342 may include scores 344 and functional areas 346. In one embodiment, scores 344 correspond to the predetermined classes of difficult items. In one embodiment, scores 344 correspond to the functional areas 346. As the role of the employee within the environment differs from that of a customer, the functional areas 346 may differ from the functional areas 330. In one embodiment, at least one functional area is shared between functional areas 346 and 330. For example, the employee may be evaluated according to his or her ability to scan items 348, bag items 350, which may be skills that are shared with customers. The employee may also be evaluated according to his or her ability to provide support or service information 352 related to an item to a customer, which is a task generally not performed by a customer.

Proficiency information 342 may include throughput data 354 that indicates the employee's relative performance during checkout transactions. For example, the throughput data 354 may be specified as throughput rates (e.g., how long does it take for the employee on average to complete a checkout transaction?), error rates (e.g., how many errors in an average checkout transaction?), and so forth.

Employee profiles 340 include medical or personal information 356 for the employee, and may include elements similar to the medical or personal information 334 discussed above. The medical or personal information 356 may include basic employment information for the employee, such as gender, age, length of time as an employee, etc. that may be used to assess the types and amount of assistance that the person is capable of providing. For example, a brand new employee would not likely have an extensive knowledge of item locations, store procedures, etc. The medical or personal information 356 may further include information related to the current work session or shift, such as how long the employee has been working. The current work session information may be analyzed to identify any trends that affect the employee's performance or ability to provide assistance. For example, the employee's throughput rates tend to decrease after a certain amount of shift time but increase following a meal break. The person of ordinary skill will recognize that many other correlations with employee performance and assistance are possible, such as the proximity of a supervisory employee.

The personal profiles 322 and employee profiles 340 may be inputs to the assistance module 358 to determine the appropriate level of assistance for transactions, as well as how best to distribute employees to provide the assistance. The assistance module 358 may also receive images 336, item information 337, as well as other information to make the determination. The assistance determination may be associated with a virtual transaction record 339, which generally includes data associated with a particular person and items selected by the person for a checkout transaction. The virtual transaction record 339 may be adaptively updated as the person interacts with items during a transaction (e.g., adds or removes items from a shopping receptacle) within the environment, and the assistance determination in some cases may be updated with the various interactions. Additional examples of the assistance determination are provided below with respect to FIGS. 7 and 8.

Figure 4:
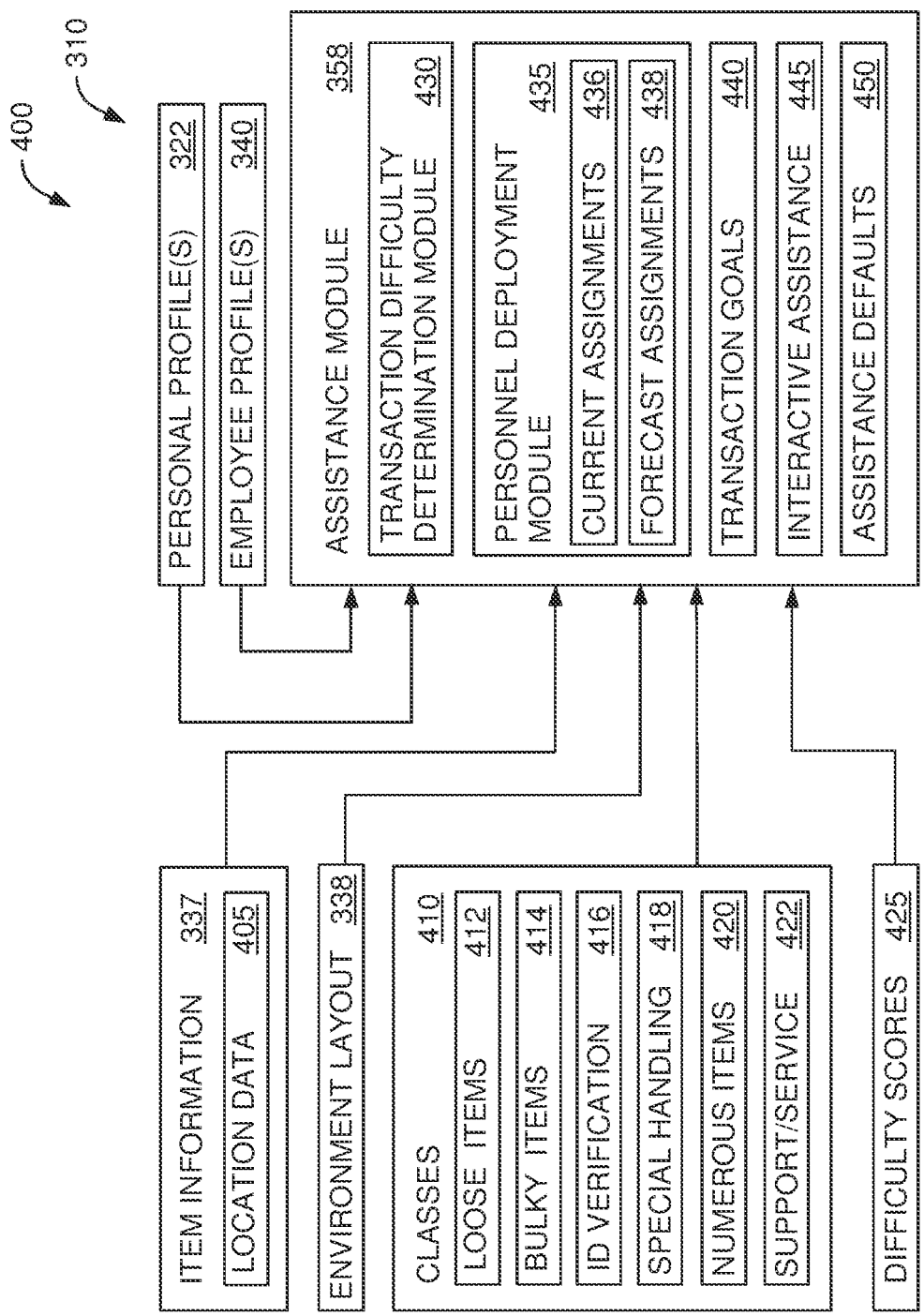
FIG. 4 is a block diagram illustrating operation of an exemplary assistance module, according to one embodiment.

FIG. 4 is a block diagram illustrating operation of an exemplary assistance module, according to one embodiment. The arrangement 400 may be used in coordination with the various systems and environments described herein. Generally, elements of the arrangement 400 may be included partially or entirely within memory 310.

Arrangement 400 includes item information 337 for items included within the environment and generally available for selection by a person. Item information 337 may include information describing any number of aspects of the items: physical properties of the items, pricing, current inventory levels, location data 405 indicating the item location(s) relative to the environment layout 338 (e.g., a planogram), and so forth. In some cases, the location data 405 may be used with images to determine which items have been selected by a person. For example, an overhead visual sensor disposed over an aisle having large bags of dog food may correlate certain locations of the aisle with a "bulky item" classification, such that when a person selects an item at the location or sufficiently close to the location, the item is classified as bulky without the need for a full identification of the item using image analysis. This may reduce a computational burden on the system.

Items in the environment may be determined to be "difficult" due to a difficulty in handling and/or processing during a transaction, and included in one or more of a predetermined number of classes 410. Classes 410 include loose items 412, such as fresh produce or bulk foods that typically require the items to be weighed and/or entry of corresponding product codes at checkout. Classes 410 include bulky items 414 that may be difficult to manipulate due to item size, shape, and/or weight, and include ID verification items 416 for age-restricted or other restricted items (such as alcohol, tobacco, movies and music, medicines, weapons, high-value items, etc.). Classes 410 include special handling items 418. In one example, a person may present a voucher to purchase a video game that is located within a locked display case. In another example, the person may select items that include or are attached to theft-prevention devices (such as electromagnetic tags), which an employee must deactivate when the person purchases the item. Classes 410 also include numerous items 420 that, although not individually problematic for a person to handle, are typically purchased in sufficient quantities that handling of the items becomes difficult. For example, items packaged in small jars, cans, or other containers that are sold separately (i.e., not grouped together in packaging) may be difficult for the person to handle during a checkout transaction. Some non-limiting examples include jars of baby food, cups of yogurt, soup cans, and so forth. Classes 410 also include items that are associated with support or service information 422 such as an item warranty, an item service plan, an item replacement or upgrade plan, and so forth. Typically, the support or service information is presented to a customer during the checkout transaction, whether by a computer-based message or by an employee. Some non-limiting examples of items associated with support or service information 422 include consumer electronics (such as media players, cell phones, computers, etc.) and consumer appliances (such as coffee makers, food processors, vacuum cleaners, etc.).

Each item in the environment may be associated with a difficulty score 425. In some embodiments, the difficulty score 425 may be calculated based on whether the item is included in one or more "difficult" classes 410. For example, an expensive bottle of alcohol may be included in two classes—ID verification class 416 and special handling class 418. Accordingly, the bottle may have a larger difficulty score than a computer hard drive that is included in only one class—special handling class 418. The difficulty scores 425 for individual items may be used to calculate a difficulty score for an entire transaction of the person (e.g., a cart full of different items).

The item difficulty scores 425 may be adaptively updated, based on customer interactions. For example, if a number of transactions indicate that the person requested assistance with a particular item, the system may update the difficulty score for the item.

As shown, assistance module 358 includes a number of functional sub-modules. A transaction difficulty determination module 430 operates to determine a difficulty level for a particular transaction based on classes 410 and/or difficulty scores 425. In one embodiment, the difficulty level for a transaction is based on a combination of the difficulty scores 425 for the various items included in the transaction. For example, the transaction difficulty level may reflect a simple sum of the item difficulty scores, a weighted sum, and so forth. In another embodiment, the transaction difficulty level is based on one or more largest item difficulty scores 425. For example, a first transaction of 12 items each having a difficulty score 1 (i.e., a sum of 1*12=12) may be assigned a lesser transaction difficulty level than a second transaction having 1 item of difficulty score 3 (indicating a greater difficulty), even though the sum of the first transaction exceeds the sum of the second transaction.

The transaction difficulty level may be represented as a determined one of a plurality of discrete levels. In one embodiment, the discrete levels are binary—that is, a transaction is determined to be either "difficult" or "not difficult." For example, a transaction may be determined difficult when it includes any item from a predetermined class 410 of "difficult" items. Of course, the transaction difficulty level may provide a greater resolution of difficulty, which may be based on composites of the item difficulty scores 425. For example, the plurality of levels may use qualitative descriptors such as "high," "medium," "low," and "no" difficulty. The plurality of levels may also use quantitative values to distinguish the different levels of difficulty.

Based on the determined transaction difficulty level, the assistance module 358 uses a personnel deployment module 435 to make changes to distributions (or assignments) of employees within the environment. The changes to the distributions generally make additional assistance available for completing difficult transactions. In one embodiment, the distribution changes are made reactively. For example, when a person associated with a difficult transaction arrives at a POS station, the assistance module 358 updates the current assignments 436 of employees to provide additional assistance at the POS station. In another embodiment, the assignment changes may also be made proactively. For example, a person selects a bulky item and places it into his or her shopping cart. The assistance module 358 may generate forecast assignments 438 to prospectively make assistance available, for example, at the estimated time of the person's checkout transaction. Estimating times for transactions may be based on, for example, the person's item and/or purchase history, a shopping list entered through a store app, the person's path through the environment, and so forth.

The personnel deployment module 435 may also analyze one or more transaction goals 440 to generate the updated assignments (i.e., updates to current assignments 436 and/or forecast assignments 438). The transaction goals 440 may specify certain performance milestones or criteria, such as throughput rates, error rates, assistance request rates, etc. The transaction goals 440 may be adaptively updated and adaptively applied based on current and predicted transactions within the environment. For example, a first set of transaction goals applied for checkout transactions at a first time may include an average checkout transaction time of 5 minutes with an average error rate of 2 errors or less per checkout transaction. The first set may be based, e.g., on the current number of checkout transactions. If, at a second time (or at a predicted second time), a significantly larger number of contemporaneous checkout transactions occur, a second set of transaction goals may be applied to streamline checkout transactions. Doing so may improve customer satisfaction (i.e., less waiting and hassle at checkout), improve mobility through the environment (i.e., no long lines), and so forth. For example, the second set of transactions may reduce the average checkout transaction time (e.g., 3 minutes instead of 5) and not apply an average error rate goal. Based on the updated transaction goals, the personnel deployment module 435 may assign additional employees to the checkout area. In some cases, the personnel deployment module 435 may preferentially select, based on information included in employee profiles 340, more experienced and/or better performing employees to ensure the updated goals are met. Of course, other transaction goals and application schemes are possible. An example of updating employee assignments is provided below with respect to FIG. 7.

In other embodiments, interactive assistance 445 provided to a person may be adapted based on the determined transaction difficulty level. For example, interactive assistance 445 may be provided to the person through a display at a self-checkout terminal, through communication with the person's mobile computing device, etc. In one embodiment, the amount of interactive assistance 445 is changed based on the transaction difficulty level. For example, when the assistance module 358 determines a "difficult" transaction occurring with a relatively inexperienced or not proficient customer (e.g., determined based on data in personal profile 322), a greater amount of interactive assistance 445 may be provided by the assistance module 358. In some cases, the interactive assistance may include sending prompts or suggestions to the person regarding the transaction. Increasing the amount of interactive assistance may include sending a greater number of prompts or suggestions, setting a lower threshold for intervening in a transaction with a prompt, and so forth. While providing a greater amount of interactive assistance to an experienced or proficient person could seem annoying or intrusive without providing any corresponding benefit, the greater interactive assistance may be particularly useful for less experienced persons in order to meet transaction goals. The assistance module 358 may determine a preferred amount of interactive assistance in an attempt to balance the intrusive nature of such assistance with a measure of the "helpfulness" of the assistance for the person based on the person's behavioral feedback responsive to the assistance (e.g., Did the person acknowledge or ignore the prompt? Did the person request human employee assistance despite the suggestions? Did the person explicitly indicate that the suggestion did not address the problem/was not helpful? etc.).

In some embodiments, the person's historical assistance information—for example, the type and/or amount of assistance provided, as well as the person's historical feedback—is included in the personal profile 322 (e.g., as the assistance history 326), and the type and/or amount of assistance provided to the person during a transaction is based on the historical assistance information included in the personal profile 322. In some cases, however, the person may be unidentified based on the images acquired in the environment, or the person may not have an associated personal profile 322. Therefore, in some embodiments, one or more assistance defaults 450 may be applied to a transaction where there is no historical assistance information associated with the person. The assistance defaults 450 may apply to all persons equally, or the assistance defaults 450 may differ based on determined properties of the person (e.g., a smaller person may tend to require greater assistance with handling bulky items than a larger person).

Figure 5:
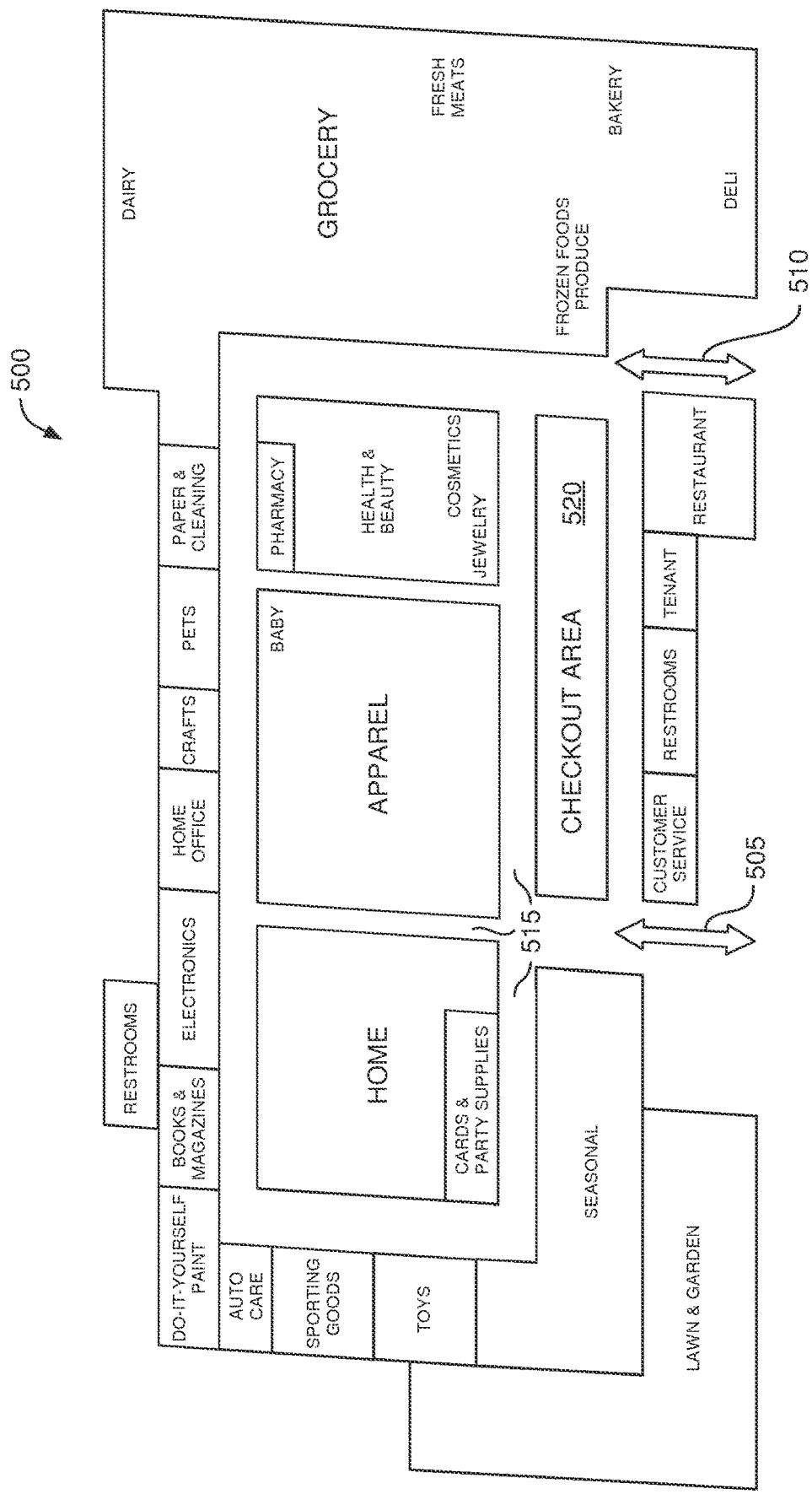
FIG. 5 illustrates an exemplary layout of an environment, according to one embodiment.

FIG. 5 illustrates an exemplary layout of an environment, according to one embodiment. Specifically, FIG. 5 depicts a projection of an exemplary floor plan 500 for the environment 100. The floor plan 500 includes areas corresponding to different departments, each of which includes a number of items available for selection and purchase. The departments (no reference numbers) are labeled with the corresponding name (e.g., "Home," "Apparel," "Seasonal," etc.). Departments, such as the grocery department, may be further subdivided into sub-departments (e.g., "Dairy," "Fresh Meats," etc.). Although not depicted, each department may include a number of shelving units or other structure that is suitable for storing, containing, and/or displaying items. The departments may be separated by one or more pathways 515, along which a person may travel to beneficially avoid navigating through certain departments.

During an exemplary transaction, a person (e.g., a customer of the environment 100) may enter any number of departments and interact with various items included therein. Some examples of interactions include viewing items, handling items, selecting items for purchase, adding items to a shopping receptacle, and so forth. Upon completion of the transaction, the person may transport selected items to a designated checkout area 520 having one or more checkout terminals or stations. The checkout area 520 may be disposed near points of entry into and/or exit from the environment, such as entrances/exits 505, 510. Checkout terminals within checkout area 520 may be manned (e.g., POS terminals) or unmanned (e.g., self-checkout terminals). A number of employees may also be assigned within or adjacent to the checkout area 520 and perform audits of checkout transactions. In one example, an employee may be stationed near an exit (e.g., entrance/exit 505 or 510) and check printed receipts following customers' checkout transactions. In another example, employees may be directed to particular checkout terminals to perform an audit during the checkout transaction, which may include interacting with the customer.

Figure 6:
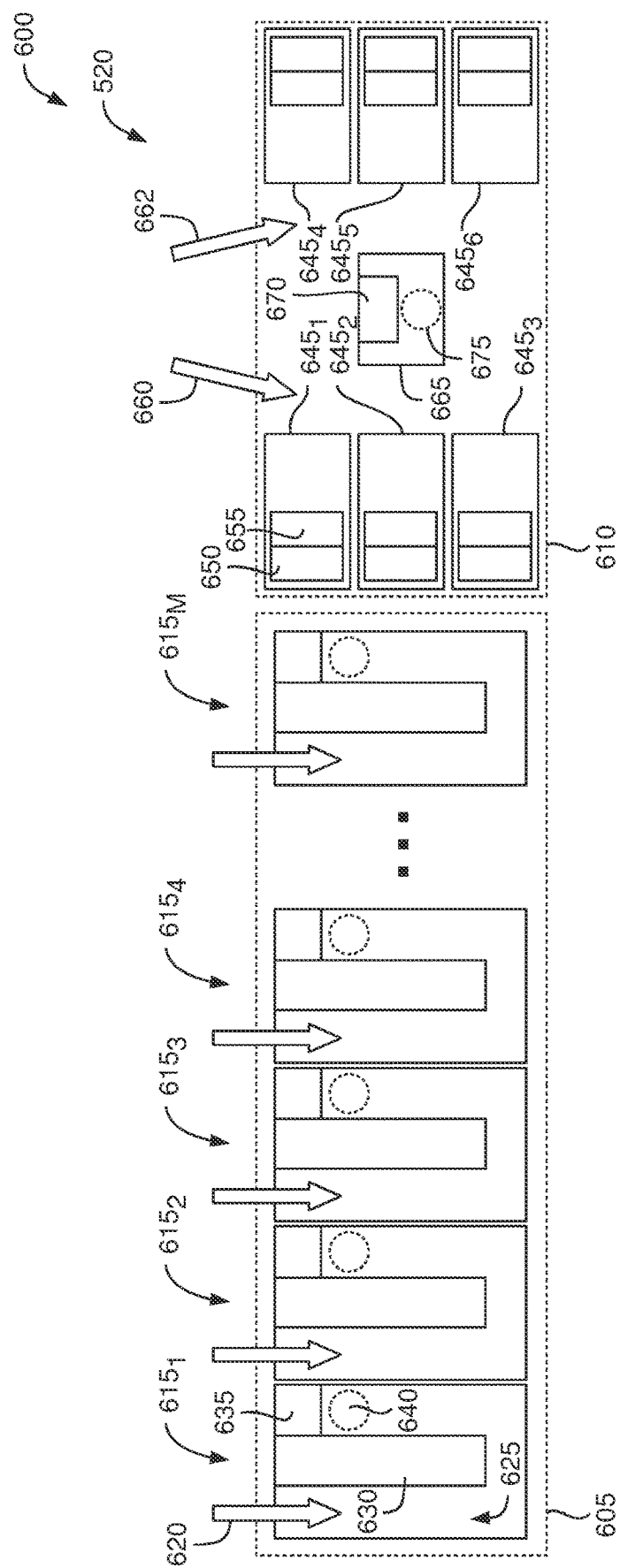
FIG. 6 illustrates an exemplary arrangement of checkout terminals within a checkout area of an environment, according to one embodiment.

FIG. 6 illustrates an exemplary arrangement of checkout terminals within a checkout area of an environment, according to one embodiment. Specifically, the arrangement 600 illustrates an example implementation of the checkout area 520.

The checkout area 520 may be sub-divided into a manned checkout portion 605 and a self-checkout portion 610. The manned checkout portion 605 includes a number of lanes $615_1$, $615_2$, $615_3$, $615_4$, . . . , $615_M$, each of which includes a pathway 625, a checkout counter 630, and a checkout terminal 635 operated by an assigned employee 640. For example, a person desiring to begin a checkout transaction at lane $615_1$ enters the corresponding pathway 625 along the direction of arrow 620. The self-checkout portion 610 includes a number of lanes $645_{1-6}$, each of which corresponds to a checkout counter 655 and a self-checkout terminal 650. Generally, a person desiring to begin a checkout transaction at one of the lanes 645 may enter the portion 610 and approach the selected lane 645 along the general direction of one of the arrows 660, 662. An employee station 665 may be disposed within the self-checkout portion 610, which may include a separate computer-based terminal 670. An assigned employee 675 may be present to assist persons completing checkout transactions in the lanes 645, to audit transactions, etc.

FIGS. 7A and 7B illustrate exemplary assignment distributions of employees within a checkout area of an environment, according to one embodiment. Generally, the scenes 700 and 720 correspond to overhead views of the checkout area 520 depicted in arrangement 600 discussed above.

Scene 700 depicts a first assignment distribution within checkout area 520. Each of the checkout lanes within the portions 605, 610 correspond to a number of employee assignment positions $701_i$, $702_i$, $703_i$, 715, 716, 717, where i=1:M. In one embodiment, positions 701, 715 correspond to primary checkout assignments, positions 702, 716 correspond to secondary or assistant checkout assignments, and position 703 corresponds to an item bagging assignment. Of course, this is a graphical representation of one possible assignment distribution, and numerous other assignments and distributions are possible. For example, assignments may correspond to alternative positions or areas of responsibility, dynamic or roving assignments such as position 717, and so forth.

Employee $710_1$ is currently assigned to the primary checkout assignment at position $701_1$, employee $710_2$ is assigned to the primary checkout assignment at position $701_2$, and employee $701_3$ is assigned to the primary checkout assignment at position 715. The other positions $701_{3 \ldots M}$, $702_{1-M}$, $703_{1-M}$, 716, and 717 do not have an employee assigned. Each employee 710 may correspond to a separate employee profile 340 that includes proficiency scores 344, ratings for functional areas 346, throughput data 354, and so forth. One or more additional employee profiles 340 correspond to other employees not staffing the checkout area, and may be accessible for determining assignment distributions.

Scene 720 depicts a second assignment distribution within checkout area 520, and the assignments may have been updated based on, e.g., current or anticipated difficult transactions, transaction goals, employee and customer proficiency levels, etc. as described above. For example, the updates may be applied immediately in response to an increase in customer transactions, difficult transactions etc. or may be prospectively determined based on estimated transaction times.

At lane $615_1$, another employee $710_4$ is assigned to the position $702_1$ (assistant checkout). For example, this assignment may reflect a detected checkout transaction having an ID verification item (which employee $710_1$ is not rated to complete according to a score in his or her employee profile 340), an item associated with service information (for which employee $710_1$ has a low rating in employee profile 340), and/or a need to increase the throughput at lane $615_1$ (i.e., improve from the throughput data reflected in employee profile 340). The employee $710_4$ may be selected particularly for their abilities in deficient areas of the employee $710_1$, as reflected in the corresponding employee profile $340_4$. For example, employee $710_4$ may be qualified to perform ID verification, have a higher service information rating, and so forth.

In some embodiments, the capabilities of the employees are collectively considered so that employees are assigned judiciously throughout the environment. For example, the employee having the single highest rating for providing service information does not need to be assigned each time another employee is deficient in providing service information. This may lead to certain proficient employees doing a disproportionate share of the work—which may hinder employee development, disincentivize proficiency, and cause employee dissatisfaction. Instead, and in view of the various transaction goals, it may be sufficient that the newly-assigned employee has the relevant score/rating/throughput data that is greater than that of the currently assigned employee. In some cases, this may also be based on threshold values; for example, a threshold value may determine whether an employee is at least marginally qualified to perform a task. Thus, an employee rated to meet the threshold for a particular task may be assigned to assist a current employee in the task, while an employee rated below the threshold is not assigned even if the rating exceeds that of the current employee.

At lane $615_2$, another employee $710_5$ is assigned to the position $703_2$ (bagging items) based on the employee profile $340_5$. For example, the employee $710_5$ may have a better rating for bagging items than the employee $710_2$. At lane $615_3$, an employee $710_6$ is assigned to position $701_3$ to open lane $615_3$ for customer checkouts and increase overall throughput. At the employee station 665, an employee $710_7$ is assigned to roving position 717 to increase overall throughput in the portion 610.

Figure 8:
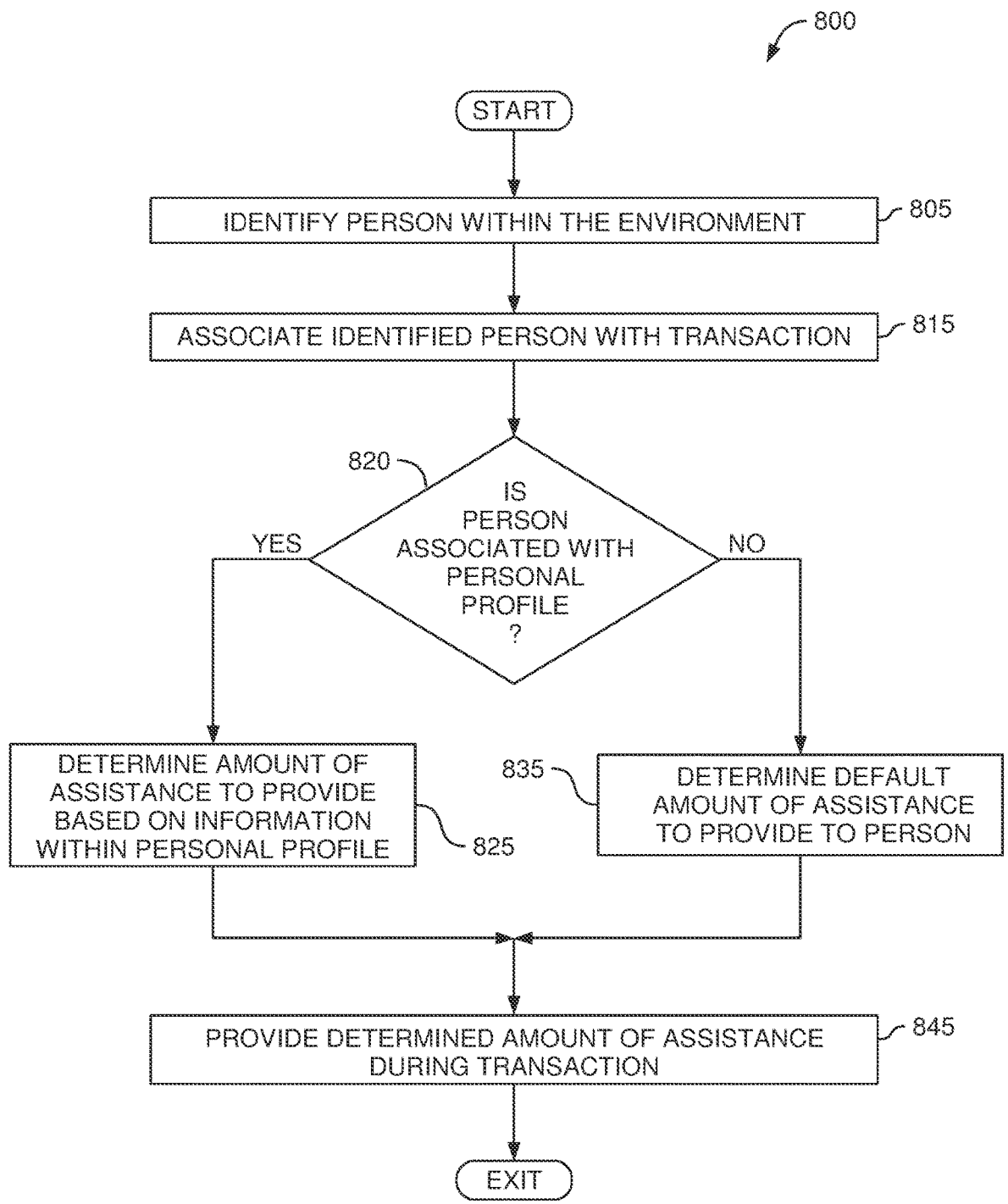
FIG. 8 is a block diagram illustrating a method to provide assistance to at least a first person during a transaction within an environment having a plurality of items, according to one embodiment.

FIG. 8 is a block diagram illustrating a method to provide assistance to at least a first person during a transaction within an environment having a plurality of items, according to one embodiment. The method 800 may be used in coordination with the system and environment described herein.

Method 800 begins at block 805, where the person is identified within the environment. In some embodiments, the identification may be performed by image analysis of image information acquired by visual sensors disposed throughout the environment. The image information may include facial recognition information, loyalty card information, etc. In some embodiments, the identification occurs through the person associating their personal computing device with a computing device in the environment, such as by opening a mobile computing app for the environment.

At block 815, the identified person is associated with a transaction. The association may include associating the person's identity with a virtual transaction record maintained for a particular transaction. In some embodiments, the transaction may be associated with a particular shopping receptacle, which may include visually encoded information (such as a bar code or QR code) or other unique identifier.

At block 820, it is determined whether the identified person is associated with a personal profile. If so ("YES"), the method proceeds to block 825, where an amount of assistance to be provided to the person is determined based on information included in the personal profile. In some embodiments, information in the personal profile may include the person's transaction history (including assistance history), proficiency information, preferences, and medical information, which may collectively be used to determine an appropriate amount of assistance to provide the person during their transaction within the environment.

However, if the identified person is not associated with a personal profile ("NO"), the method proceeds to block 835, where a default amount of assistance is determined to be provided to the person. In some cases, the default amount of assistance may generally tend to provide additional assistance to the person (when compared with amounts provided to persons associated with personal profiles) to form a favorable first impression of the environment, or of particular aspects thereof. In one example, the default amount of assistance for a first-time user of a self-checkout lane may be more "helpful" (i.e., relatively more assistance provided) to form a positive impression of self-checkout and thereby encourage the person to use self-checkout during subsequent transactions. The default amount of assistance may apply to all persons equally, or the default amount may differ based on determined properties of the person (e.g., a smaller person may tend to require greater assistance with handling bulky items than a larger person).

At block 845, the determined amount of assistance is provided to the person during the transaction. In some embodiments, the assistance may be provided through adapting a current assignment distribution based on employee proficiency levels. In some embodiments, the assistance may be computer-based assistance provided though a self-checkout terminal or other computing device in the environment.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module," or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may access applications (e.g., a retail store app for a mobile computing device) or related data (e.g., compiled shopping data) available in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method to provide assistance to at least a first person during a first transaction within an environment, the environment having a plurality of items available for selection by the first person, the method comprising:
   identifying the first person within the environment to associate the first person with a first virtual transaction record, wherein the first virtual transaction record is maintained during the first transaction using one or more computer processors;
   acquiring, using a visual sensor disposed within the environment and communicatively coupled with the one or more computer processors, image information that includes the first person and at least a first item of the plurality of items;
   analyzing, using the one or more computer processors, the acquired image information to determine a first item interaction relating to the first item, wherein the first virtual transaction record is updated with information related to the determined first item interaction;
   determining, using the one or more computer processors, an item difficulty score associated with the first item, based on the first item interaction;
   determining, using the one or more computer processors, based on the updated first virtual transaction record and the item difficulty score, a transaction difficulty level of the first transaction;
   retrieving from a memory, using the one or more computer processors, a first personal profile having a predefined association with the first person;
   forecasting, using the one or more computer processors, based on information included in the first personal profile and the determined transaction difficulty level, and prior to the first transaction occurring, that additional assistance should be provided to the first person during the first transaction;
   identifying, based on the first personal profile, historical assistance information comprising a description of interactive assistance previously provided to the first person in response to a problem previously encountered by the first person;

adapting interactive assistance for the first person by determining information to display to the first person based on the determined transaction difficulty level and the historical assistance information; and upon determining that additional assistance should be provided to the first person during the first transaction, providing the interactive assistance to the first person by displaying the information using one or more displays within the environment.

2. The computer-implemented method of claim 1, further comprising:

transmitting an instruction, using the one or more computer processors, to adapt a current assignment distribution of employees within the environment to produce a modified assignment distribution assigning one or more employees to assist the first person during the first transaction, wherein the modified assignment distribution assigns at least one more employee to assist the first person during the first transaction than the current assignment distribution.

3. The computer-implemented method of claim 2, wherein adapting the current assignment distribution of employees is based on respective proficiency information for each of the employees included in the current assignment distribution, wherein the respective proficiency information includes scores corresponding to one or more predetermined functional areas.

4. The computer-implemented method of claim 1, further comprising:

identifying a second person during a second transaction within the environment;

associating the identified second person with a second virtual transaction record;

determining that the memory does not include a second personal profile having a predefined association with the identified second person; and determining that a default amount of assistance should be provided to the second person during the second transaction, wherein the default amount of assistance is relatively less than the assistance for the first person.

5. The computer-implemented method of claim 1, wherein the first transaction is a checkout transaction in a checkout area of the environment, and wherein the information included in the first personal profile indicates a personal preference for completing the checkout transaction using one of a self-checkout terminal and a manned checkout terminal.

6. The computer-implemented method of claim 1, wherein the first personal profile includes at least a first proficiency score determined for the first person based on personal historical information reflecting one or more previous transactions, and wherein determining that additional assistance should be provided to the first person is based on the first proficiency score.

7. The computer-implemented method of claim 1, wherein providing interactive assistance to the first person by displaying information using one or more displays within the environment further comprises activating the one or more displays and displaying at least one of: (i) one or more prompts and (ii) one or more suggestions on the one or more displays, wherein the prompts or suggestions are adapted based on the determined transaction difficulty level.

8. The computer-implemented method of claim 1, further comprising:

receiving one or more transaction goals related to performance of the first transaction, wherein adapting the interactive assistance for the first person is further based on the one or more transaction goals, wherein the one or more transaction goals comprise at least one of: (i) a throughput rate, (ii) an error rate, or (iii) an assistance request rate.

9. The computer-implemented method of claim 1, wherein the description of interactive assistance previously provided to the first person comprises at least one of a type or an amount of the previously provided interactive assistance and wherein the historical assistance information further comprises feedback from the first person relating to the previously provided interactive assistance to the first person.

10. The computer-implemented method of claim 9, wherein the feedback indicates that the first person requires increased assistance, relative to the previously provided interactive assistance, and wherein adapting the interactive assistance comprises at least one of: (i) increasing an amount of information provided to the first person, relative to the previous interactive assistance, or (ii) lowering a threshold for intervening in the first transaction with assistance, relative to the previous interactive assistance.

11. The computer-implemented method of claim 10, wherein the feedback comprises at least one of: (i) the first person ignoring a prompt, (ii) the first person requesting further assistance, or (iii) the first person expressly indicating that the previous interactive assistance was not helpful.

12. A computer program product to provide assistance to at least a first person during a first transaction within an environment, the environment having a plurality of items available for selection by the first person, the computer program product comprising:

a computer-readable storage medium having computer-readable program code embodied therewith, the computer-readable program code executable by one or more computer processors to perform an operation that includes:

identifying the first person within the environment to associate the first person with a first virtual transaction record, wherein the first virtual transaction record is maintained during the first transaction using the one or more computer processors;

acquiring, using a visual sensor disposed within the environment and communicatively coupled with the one or more computer processors, image information that includes the first person and at least a first item of the plurality of items;

analyzing the acquired image information to determine a first item interaction relating to the first item, wherein the first virtual transaction record is updated with information related to the determined first item interaction;

determining, using the one or more computer processors, an item difficulty score associated with the first item, based on the first item interaction;

determining, based on the updated first virtual transaction record and the item difficulty score, a transaction difficulty level of the first transaction;

retrieving from a memory a first personal profile having a predefined association with the first person;

forecasting, based on information included in the first personal profile and the determined transaction difficulty level, and prior to the first transaction occurring, that additional assistance should be provided to the first person during the first transaction;

identifying, based on the first personal profile, historical assistance information comprising a description of interactive assistance previously provided to the first person in response to a problem previously encountered by the first person;

adapting interactive assistance for the first person by determining information to display to the first person based on the determined transaction difficulty level and the historical assistance information; and upon determining that additional assistance should be provided to the first person during the first transaction, providing the interactive assistance to the first person by displaying the information using one or more displays within the environment.

13. The computer program product of claim 12, wherein an instruction to provide additional assistance to the first person during the first transaction is transmitted to an assistance module of a computer system, and wherein the instruction comprises an instruction to:

adapt a current assignment distribution of employees within the environment to produce a modified assignment distribution assigning one or more employees to assist the first person during the first transaction, wherein the modified assignment distribution assigns at least one more employee to assist the first person during the first transaction than the current assignment distribution, and wherein adapting the current assignment distribution of employees is based on respective proficiency information for each of the employees included in the current assignment distribution, wherein the respective proficiency information includes scores corresponding to one or more predetermined functional areas.

14. The computer program product of claim 12, the operation further including:

identifying a second person during a second transaction within the environment;

associating the identified second person with a second virtual transaction record;

determining that the memory does not include a second personal profile having a predefined association with the identified second person; and determining that a default amount of assistance should be provided to the second person during the second transaction, wherein the default amount of assistance is relatively less than the assistance for the first person.

15. The computer program product of claim 12, wherein the first transaction is a checkout transaction in a checkout area of the environment, wherein the information included in the first personal profile indicates a personal preference for completing the checkout transaction using one of a self-checkout terminal and a manned checkout terminal, and wherein the personal preference is determined by the one or more computer processors based on assistance history information included in the first personal profile.

16. The computer program product of claim 12, wherein the first personal profile includes at least a first proficiency score determined for the first person based on personal historical information reflecting one or more previous transactions, and wherein determining that additional assistance should be provided to the first person is based on the first proficiency score.

17. A system to provide assistance to at least a first person during a first transaction within an environment, the environment having a plurality of items available for selection by the first person, the system comprising:

one or more computer processors;

at least one visual sensor disposed within the environment and communicatively coupled with the one or more computer processors; and a memory containing program code which, when executed by the one or more computer processors, performs an operation that includes:

identifying the first person within the environment to associate the first person with a first virtual transaction record, wherein the first virtual transaction record is maintained during the first transaction using the one or more computer processors;

acquiring, using the at least one visual sensor, image information that includes the first person and at least a first item of the plurality of items;

analyzing the acquired image information to determine a first item interaction relating to the first item, wherein the first virtual transaction record is updated with information related to the determined first item interaction;

determining, using the one or more computer processors, an item difficulty score associated with the first item, based on the first item interaction;

determining, based on the updated first virtual transaction record and the item difficulty score, a transaction difficulty level of the first transaction;

retrieving from a memory a first personal profile having a predefined association with the first person;

forecasting, based on information included in the first personal profile and the determined transaction difficulty level, and prior to the first transaction occurring, that additional assistance should be provided to the first person during the first transaction;

identifying, based on the first personal profile, historical assistance information comprising a description of interactive assistance previously provided to the first person in response to a problem previously encountered by the first person;

adapting interactive assistance for the first person by determining information to display to the first person based on the determined transaction difficulty level and the historical assistance information; and upon determining that additional assistance should be provided to the first person during the first transaction, providing the interactive assistance to the first person by displaying the information using one or more displays within the environment.

18. The system of claim 17 wherein an instruction to provide additional assistance to the first person during the first transaction is transmitted to an assistance module of a computer system, and wherein the instruction comprises an instruction to:

adapt a current assignment distribution of employees within the environment to produce a modified assignment distribution assigning one or more employees to assist the first person during the first transaction, wherein the modified assignment distribution assigns at least one more employee to assist the first person during the first transaction than the current assignment distribution, and wherein adapting the current assignment distribution of employees is based on respective proficiency information for each of the employees included in the current assignment distribution, wherein the respective proficiency information includes scores corresponding to one or more predetermined functional areas.

19. The system of claim 17, the operation further including:
- identifying a second person during a second transaction within the environment;
- associating the identified second person with a second virtual transaction record;
- determining that the memory does not include a second personal profile having a predefined association with the identified second person; and
- determining that a default amount of assistance should be provided to the second person during the second transaction, wherein the default amount of assistance is relatively less than the assistance for the first person.

20. The system of claim 17, wherein the first transaction is a checkout transaction in a checkout area of the environment, wherein the information included in the first personal profile indicates a personal preference for completing the checkout transaction using one of a self-checkout terminal and a manned checkout terminal, and wherein the personal preference is determined by the one or more computer processors based on assistance history information included in the first personal profile.

* * * * *